Patented July 2, 1935

2,006,934

UNITED STATES PATENT OFFICE 2,006,934

PROCESS FOR THE MANUFACTURE OF DISPERSION PRODUCTS

Edmond Tassel, Villers Saint-Paul, France, assignor to Compagnie Nationale de Matieres Colorantes et Manufactures de Produits Chimiques du Nord Reunies, Etablissements Kuhlmann, Paris, France, a corporation of France No Drawing. Application October 1, 1931, Serial No. 566,315. In France June 30, 1931

10 Claims. (Cl. 260—3)

My invention relates to the manufacture of new dispersion products.

The process of the invention consists in condensing an aldehyde with the sulphonation product of a mixture of a phenol and an ester-like material selected from a group consisting of wool fat, castor oil, spermaceti and carnauba wax.

The sulphonating agent may be sulphuric acid, oleum, chlorsulphonic acid or the like or a mixture thereof.

The new products thereby obtained possess dispersing properties and also a certain tanning power. As dispersing agents they can be used notably in the textile industry, in spinning, bleaching, weaving, dyeing, printing and finishing, in the leather, paper and like industries. Their tanning properties permit of their use as adjuvants in the tanning of leather, and as mordants or as resisting agents in dyeing and printing.

These products can be used either alone, or in admixture with other agents such as solvents, soaps, wetting agents, protective colloids or the like, permitting certain special effects to be obtained.

The following examples illustrate the invention:—

Example 1

A mixture of 60 gms. of wool fat (cholesterol, the active principle of this fat having the formula $C_{27}H_{46}O$) and 200 gms. of phenol is sulphonated in the customary manner with 300 gms. of sulphuric acid monohydrate. After sulphonation, to this product 200 gms. of 30% formaldehyde are added with strong cooling. When the condensation is complete, the whole is neutralized with caustic soda lye, and the excess of sodium sulphate is eliminated by cooling and filtration.

Example 2

A mixture of castor oil (ricinoleic acid having the formula $C_{18}H_{34}O_3$) and cresol (meta and para 60/40) is sulphonated with sulphuric acid monohydrate, as in Example 1. Then the whole is treated with 60 gms. of acetaldehyde and the operation is completed as above.

Example 3

A mixture of 133 gms. of 1-amino-2-methylanthraquinone paste (30%) and 100 gms. of the condensation product of Example 1 is ground together for two hours. After drying and grinding a powder is obtained which disperses very rapidly in water, and is particularly useful for dyeing cellulose acetate silk.

Example 4

Into water of 55° of hardness according to the French scale, is introduced 1 gm. per litre of the condensation product of Example 2; then Marseilles soap is added in the proportion of 2 gms. per litre. The calcium soap stays in colloidal suspension whereas the same water, to which a dispersing agent has not been added, precipitates the soap entirely.

Example 5

In water of 27° of hardness according to the French scale, cotton thread is dyed with 2% of solanthrene blue NB according to the customary dyeing formula with the addition of 2 parts per 1000 of the product of Example 1. A dyeing is obtained of intensity almost equal to that obtained from distilled water.

Example 6

The dyeing of cross reels of cotton thread with solanthrene violet N2R is effected in the customary manner in water of 24° of hardness according to the French scale with the addition of 2 parts per 1000 of the condensation product of Example 1.

The dyeing takes place evenly without precipitation of dyestuff which is insoluble in the calcareous water.

Example 7

The bottoming of cotton thread is effected in a bath of naphtazol NSW prepared according to the customary formula, and with the addition of 4 gms. per litre of the bath of the product of Example 1 in water of 22° of hardness according to the French scale; the solution is translucent, and the bottoming takes place normally. In addition, the solution keeps for a very long time without decomposition, and the slight deposit which is produced after a long time comes off the vats very easily, whereas without this condition, the deposit is produced immediately, adheres very strongly to the sides, and becomes very difficult to remove.

Example 8

5 gms. of wool containing effect threads of natural silk, are dyed with 8% of wool black NEF in the customary manner. After 1 hour 20% of the product of Example 1 is added to the dye bath: after ½ an hour of boiling an excellent reserve on the silk is obtained.

What I claim is:

1. A process for the manufacture of new dispersion products which consists in sulphonating a mixture of a phenol and spermaceti and then condensing the sulphonation product obtained with an aldehyde.

2. A process for the manufacture of new dispersion products which consists in condensing an aldehyde with the sulphonation product of a mixture of a phenol and an ester-like material selected from a group consisting of wool fat, castor oil, spermaceti and carnauba wax.

3. A process for the manufacture of new dispersion products which consists in condensing an aldehyde with the sulphonation product of a mixture of a phenol and wool fat.

4. A process for the manufacture of new dispersion products which consists in sulphonating a mixture of a phenol with an ester-like material selected from a group consisting of wool fat, castor oil, spermaceti and carnauba wax by means of sulphuric acid and condensing the sulphonation product obtained with an aldehyde.

5. A process for the manufacture of new dispersion products which consists in sulphonating a mixture of a phenol with an ester-like material selected from a group consisting of wool fat, castor oil, spermaceti and carnauba wax by means of oleum and condensing the sulphonation product obtained with an aldehyde.

6. A process for the manufacture of new dispersion products which consists in sulphonating a mixture of a phenol with an ester-like material selected from a group consisting of wool fat, castor oil, spermaceti and carnauba wax by means of chlorosulphuric acid and condensing the sulphonation product obtained with an aldehyde.

7. A process for the manufacture of new dispersion products which consists in sulphonating a mixture of a phenol with an ester-like material selected from a group consisting of wool fat, castor oil, spermaceti and carnauba wax by means of a mixture of sulphuric acid, oleum and chlorosulphuric acid and condensing the sulphonation product obtained with an aldehyde.

8. A process for the manufacture of new dispersion products which consists in sulphonating a mixture of a phenol and wool fat and condensing the sulphonation product obtained with an aldehyde.

9. A process for the manufacture of new dispersion products which consists in sulphonating a mixture of a phenol and castor oil and condensing the sulphonation product obtained with an aldehyde.

10. As a new article of manufacture a dispersion product prepared by condensing an aldehyde with the sulphonation product of a mixture of a phenol and an ester-like material selected from a group consisting of wool fat, castor oil, spermaceti and carnauba wax substantially as described.

EDMOND TASSEL.